(12) United States Patent
Pinayour Chandrasekaran et al.

(10) Patent No.: US 11,737,099 B2
(45) Date of Patent: Aug. 22, 2023

(54) PUCCH AND PCI CONFIGURATION FOR SMALL CELL BASE STATION

(71) Applicant: QUALCOMM Incorporated, San Diego, CA (US)

(72) Inventors: Sarath Pinayour Chandrasekaran, Hyderabad (IN); Loksiva Paruchuri, Hyderabad (IN); Satish Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 17/163,263

(22) Filed: Jan. 29, 2021

(65) Prior Publication Data

US 2022/0248393 A1    Aug. 4, 2022

(51) Int. Cl.
*H04W 72/21* (2023.01)
*H04B 1/713* (2011.01)
*H04W 52/14* (2009.01)

(52) U.S. Cl.
CPC ............ *H04W 72/21* (2023.01); *H04B 1/713* (2013.01); *H04W 52/146* (2013.01)

(58) Field of Classification Search
None
See application file for complete search history.

(56) References Cited

U.S. PATENT DOCUMENTS

| | | | | |
|---|---|---|---|---|
| 10,187,782 | B2 * | 1/2019 | Haman | H04W 72/042 |
| 10,548,181 | B2 * | 1/2020 | Siomina | H04W 48/16 |
| 10,624,068 | B2 * | 4/2020 | Hwang | H04L 5/0094 |
| 2009/0060004 | A1 * | 3/2009 | Papasakellariou | H04W 72/0466 375/140 |
| 2012/0184206 | A1 * | 7/2012 | Kim | H04W 52/243 455/11.1 |
| 2013/0077569 | A1 * | 3/2013 | Nam | H04W 52/288 370/328 |

(Continued)

OTHER PUBLICATIONS

"3rd Generation Partnership Project Technical Specification Group Services and System Aspects, Telecommunication Management, Study on the Self-Organizing Networks (SON) for 5G networks (Release16)",3GPP Standard Technical Report, 3GPP TR 28.861, 3GPP, vol. SA WG5, No. V1.1, Jan. 2, 2020 (Jan. 2, 2020), pp. 1-49, XP051841065, Retrieved from the Internet: URL: ftp://ftp.3gpp.org/Specs/archive/28_series/28.861/28861-110.zip 28861-110.doc [Retrieved on Jan. 2, 2020] paragraphs [5.5.1], [5.5.3.1], [7.3.2].

(Continued)

*Primary Examiner* — Gregory B Sefcheck
(74) *Attorney, Agent, or Firm* — Procopio, Cory, Hargreaves & Savitch LLP/Qualcomm

(57) ABSTRACT

A base station (BS) may receive at least one system information block (SIB) from one or more neighbor BSs, extract a physical uplink control channel (PUCCH) common configuration from the SIB for each of the one or more neighbor BSs, and select one or more PUCCH common configuration parameters for the BSs to avoid having a same PUCCH common configuration as the one or more neighbor base stations, the same PUCCH common configuration including at least one of a PUCCH hopping parameter or a common PUCCH resource.

28 Claims, 7 Drawing Sheets

(56) References Cited

U.S. PATENT DOCUMENTS

| | | | | |
|---|---|---|---|---|
| 2013/0163534 A1* | 6/2013 | Anderson | H04L 5/0016 | 370/329 |
| 2013/0188624 A1* | 7/2013 | Lee | H04W 24/02 | 370/338 |
| 2013/0315212 A1* | 11/2013 | Sorrentino | H04J 11/0026 | 370/336 |
| 2014/0016576 A1* | 1/2014 | Noh | H04W 52/247 | 370/329 |
| 2014/0204853 A1* | 7/2014 | Ko | H04L 5/0048 | 370/329 |
| 2015/0071196 A1* | 3/2015 | Park | H04W 72/0413 | 370/329 |
| 2015/0124673 A1* | 5/2015 | Ouchi | H04W 52/58 | 370/311 |
| 2016/0037550 A1* | 2/2016 | Barabell | H04W 72/1263 | 455/450 |
| 2016/0127090 A1* | 5/2016 | Takeda | H04L 5/0053 | 370/329 |
| 2016/0212632 A1* | 7/2016 | Katamreddy | H04W 8/005 | |
| 2016/0345118 A1* | 11/2016 | Oh | H04B 1/713 | |
| 2017/0134881 A1* | 5/2017 | Oh | H04L 5/14 | |
| 2017/0311276 A1* | 10/2017 | Tsai | H04W 56/001 | |
| 2017/0374675 A1* | 12/2017 | Hwang | H04L 5/0055 | |
| 2018/0131483 A1* | 5/2018 | Somichetty | H04L 5/0012 | |
| 2018/0139586 A1* | 5/2018 | Park | H04L 5/005 | |
| 2018/0206224 A1* | 7/2018 | Hwang | H04L 5/0055 | |
| 2018/0249321 A1* | 8/2018 | Haman | H04W 72/0413 | |
| 2019/0104549 A1* | 4/2019 | Deng | H04W 24/08 | |
| 2019/0280734 A1* | 9/2019 | Park | H04L 5/0012 | |
| 2020/0053680 A1* | 2/2020 | Abedini | H04W 28/16 | |
| 2020/0059994 A1* | 2/2020 | Li | H04B 17/327 | |
| 2020/0100148 A1* | 3/2020 | Wang | H04W 36/0061 | |
| 2020/0163079 A1* | 5/2020 | Choi | H04W 72/0413 | |
| 2020/0178242 A1* | 6/2020 | Yamamoto | H04W 72/0413 | |
| 2020/0374085 A1* | 11/2020 | Yin | H04L 5/0053 | |
| 2020/0389204 A1* | 12/2020 | Matsumura | H04B 1/7143 | |
| 2020/0396654 A1* | 12/2020 | Freda | H04W 36/08 | |
| 2021/0112474 A1* | 4/2021 | Manolakos | H04L 5/005 | |
| 2021/0120506 A1* | 4/2021 | Takeda | H04W 48/16 | |
| 2021/0298048 A1* | 9/2021 | Sosnin | H04W 72/0446 | |
| 2022/0224466 A1* | 7/2022 | Ji | H04L 5/0035 | |

OTHER PUBLICATIONS

Interdigital Communications, et al., "Transmission of Uplink Control Signalling", 3GPP Draft, 3GPP TSG-RAN WG1 Meeting #68bis, R1-121316, 3rd Generation Partnership Project (3GPP), Mobile Competence Centre, 650, Route Des Lucioles, F-06921 Sophia-Antipolis Cedex, France, vol. RAN WG1, No. Jeju, Korea, Mar. 26, 2012-Mar. 30, 2012, Mar. 20, 2012 (Mar. 20, 2012), XP050599606, 3 Pages, [Retrieved on Mar. 20, 2012] paragraphs [0002], [0003].

International Search Report and Written Opinion—PCT/US2021/064950—ISA/EPO—dated Apr. 26, 2022.

Spreadtrum Communications: "Remaining Aspects of short PUCCH", 3GPP Draft, 3GPP TSG RAN WG1 Meeting AH 1801, R1-1800279, Remaining Details on Short-PUCCH_VI, 3rd Generation Partnership Project (3GPP), vol. RAN WG1, No. Vancouver, Canada, Jan. 22, 2018-Jan. 26, 2018, Jan. 12, 2018 (Jan. 12, 2018), XP051384301, 2 Pages, Retrieved from the Internet: URL: http://www.3gpp.org/ftp/tsg%5Fran/WG1%5FRL1/TSGR1%5FAH/NR%5FAH%5F1801/Docs/ [Retrieved on Jan. 12, 2018] Paragraphs [02.1], [02.2].

* cited by examiner

PUCCH AND PCI CONFIGURATION FOR SMALL CELL BASE STATION

BACKGROUND

Technical Field

The present disclosure generally relates to communication systems, and more particularly, to wireless communication including a configuration for a base station (BS).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station that may receive at least one system information block (SIB) from one or more neighbor base stations, extract a PUCCH common configuration from the SIB for each of the one or more neighbor base stations, and select one or more PUCCH common configuration parameters for the base station to avoid having a same PUCCH common configuration as the one or more neighbor base stations, the same PUCCH common configuration including at least one of a PUCCH hopping parameter or a common PUCCH resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
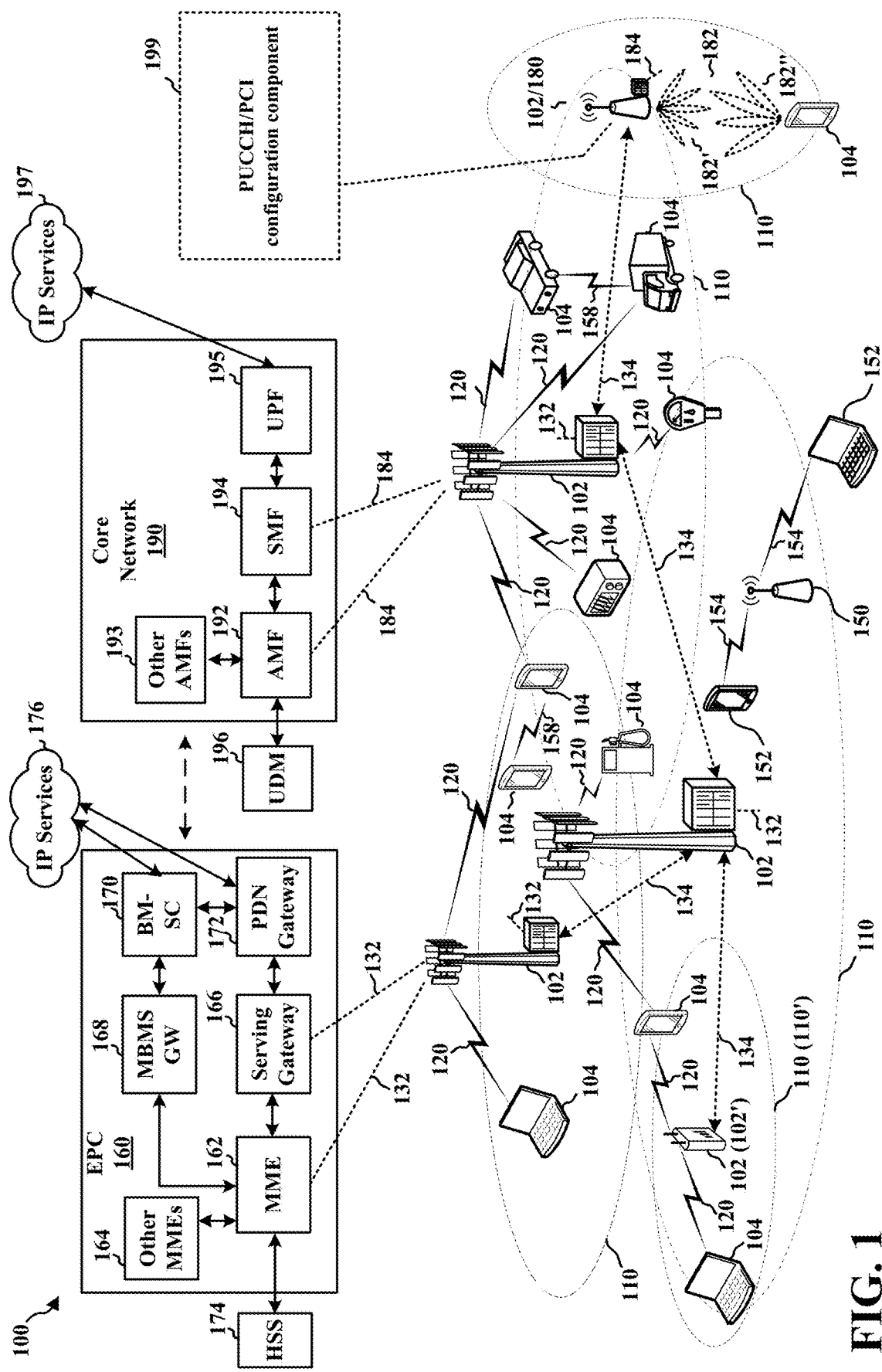
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some wireless communication systems, a base station may be placed and begin operating without network based planning. For example, a self-organized network (SON) may include small cells that a user may place and initiate its operation. Such a small cell device may be referred to as a plug and play device and may not have a location or configuration decided by a central network entity. A base station may operate in a dense wireless communication network nearby or overlapping with coverage from other neighboring base stations. Aspects presented herein enable the base station to detect neighbor cell configurations and to plan its own configuration to avoid interference with the neighbor cells.

As presented herein, a base station may receive at least one SIB from one or more neighbor base stations, extract a PUCCH common configuration from the SIB for each of the one or more neighbor base stations, and select one or more PUCCH common configuration parameters for the base station to avoid having a same PUCCH common configuration as the one or more neighbor base stations, the same PUCCH common configuration including at least one of a PUCCH hopping parameter or a common PUCCH resource.

In some aspects, the base station may extract at least one PUCCH hopping ID of the one or more neighbor base stations from the received at least one SIB, and the one or more PUCCH common configuration parameters may be selected by determining an ID associated with PUCCH hopping of the base station that generates a different PUCCH hopping parameter than the extracted at least one PUCCH hopping ID of the one or more neighbor base stations. The base station may select the ID associated with the PUCCH hopping of the base station to be different than the extracted at least one PUCCH hopping ID after application of a modulus operation for the PUCCH hopping. The PUCCH hopping may include at least one of PUCCH group hopping or PUCCH sequence hopping, and the base station may determine the identifier associated with the PUCCH hopping of the base station; $n_{ID1}$ such that $n_{ID1}$ modulo 30 is not equal to $n_{ID2}$ modulo 30, where the $n_{ID2}$ is the PUCCH hopping ID of each of the one or more neighbor base stations. The base station may further include determining a PCI of the base station such that PCI modulo 30 is not equal to $n_{ID2}$ modulo 30, where the $n_{ID2}$ is the PUCCH hopping ID of each of the one or more neighbor base stations. The ID associated with the PUCCH hopping may include a hopping ID or a cell ID.

In some aspects, the base station may select the one or more PUCCH common configuration parameters by selecting a different common PUCCH resource than the one or more neighbor base stations, and the different common PUCCH resource parameter may indicate at least one of a time resource, a frequency resource, or an initial cyclic shift index different from corresponding common PUCCH resource parameter of the one or more neighbor base stations include.

In some aspects, the base station may select a PCI for the base station to be same as a first neighbor base station among the one or more neighbor base stations having the minimum channel metric, and select a PUCCH power control parameter for the base station to be smaller than the first neighbor base station.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base station 102 or 180 may include a PUCCH/PCI configuration component 199 configured to receive at least one SIB from one or more neighbor base stations, extract a PUCCH common configuration from the SIB for each of the one or more neighbor base stations, and select one or more PUCCH common configuration parameters for the base station to avoid having a same PUCCH common configuration as the one or more neighbor base stations, the same PUCCH common configuration including at least one of a PUCCH hopping parameter or a common PUCCH resource. Although the following description may be focused on 5G NR, the concepts described herein may be applicable to other similar areas, such as LTE, LTE-A, CDMA, GSM, and other wireless technologies.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
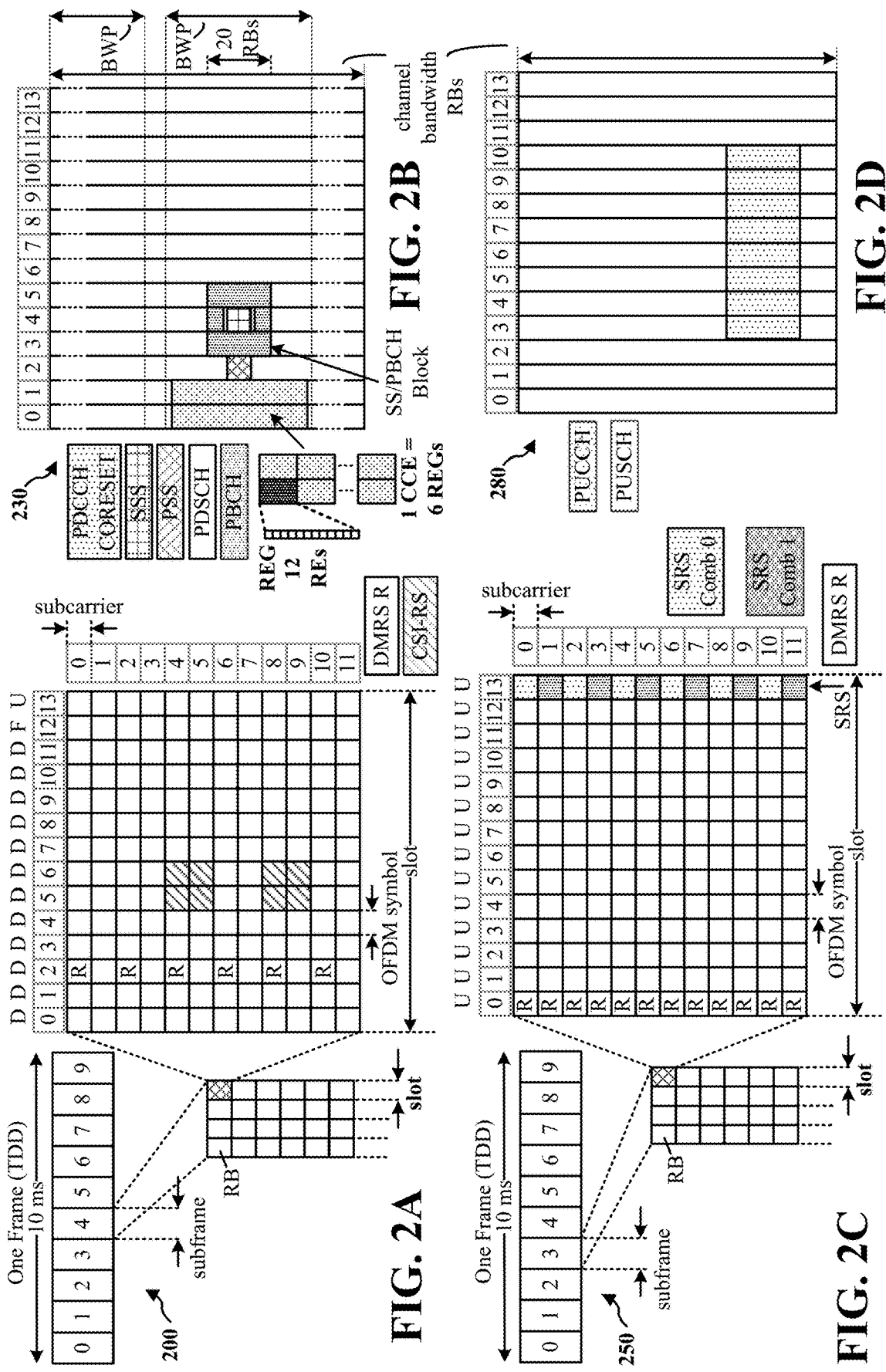
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
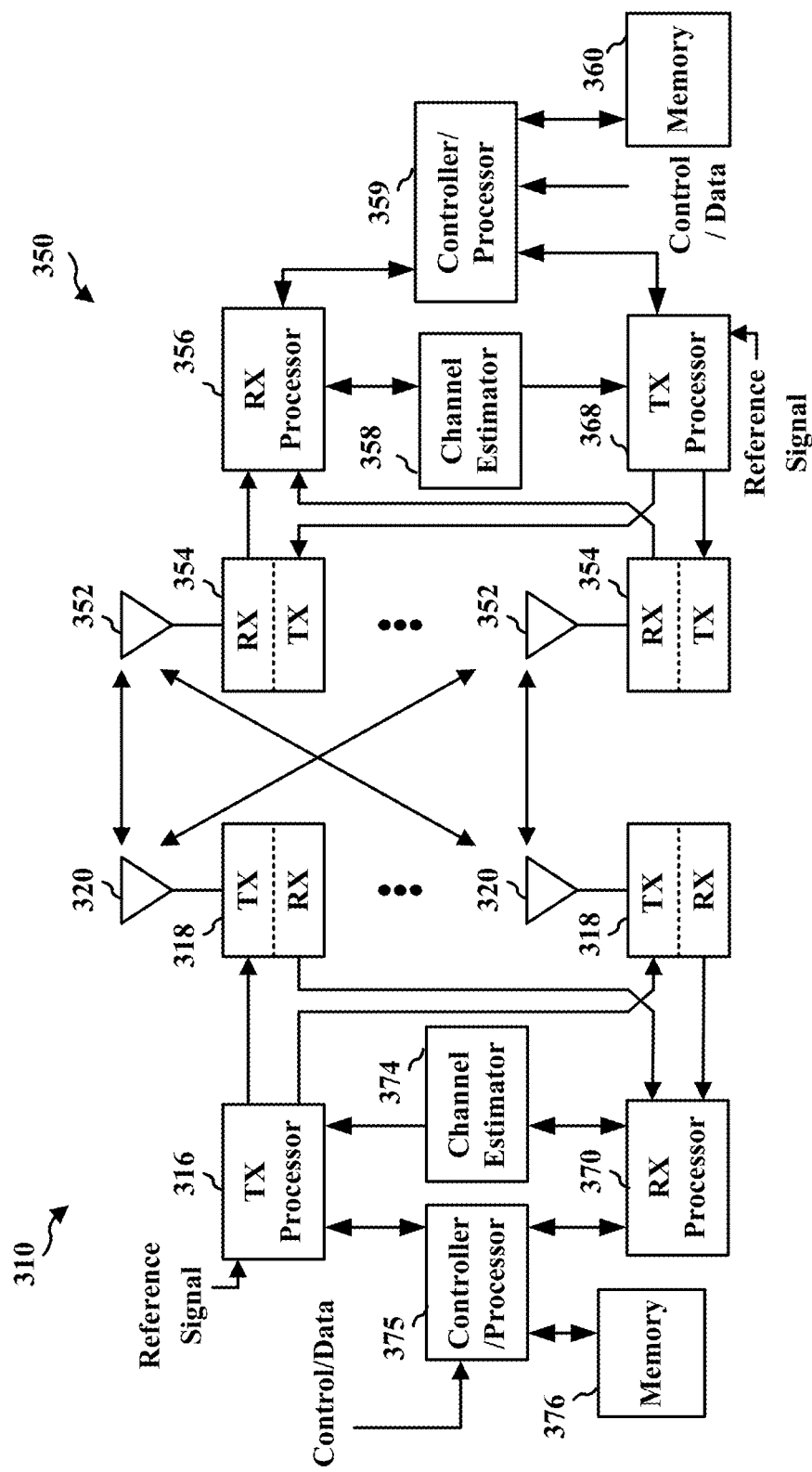
FIG. 3 is a block diagram of a base station in communication with a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the PUCCH/PCI configuration component 199 of FIG. 1.

In some wireless communication systems, a base station may be placed and begin operating without network based planning. For example, a self-organized network (SON) may include small cells that a user may place and initiate operation. Such a small cell device may be referred to as a plug and play device and may not have a location or configuration decided by a central network entity. A base station may operate in a dense wireless communication network nearby or overlapping with coverage from other neighboring base stations. Aspects presented herein enable the base station to detect neighbor cell configurations and to plan its own configuration to avoid interference with the neighbor cells.

Figure 4:
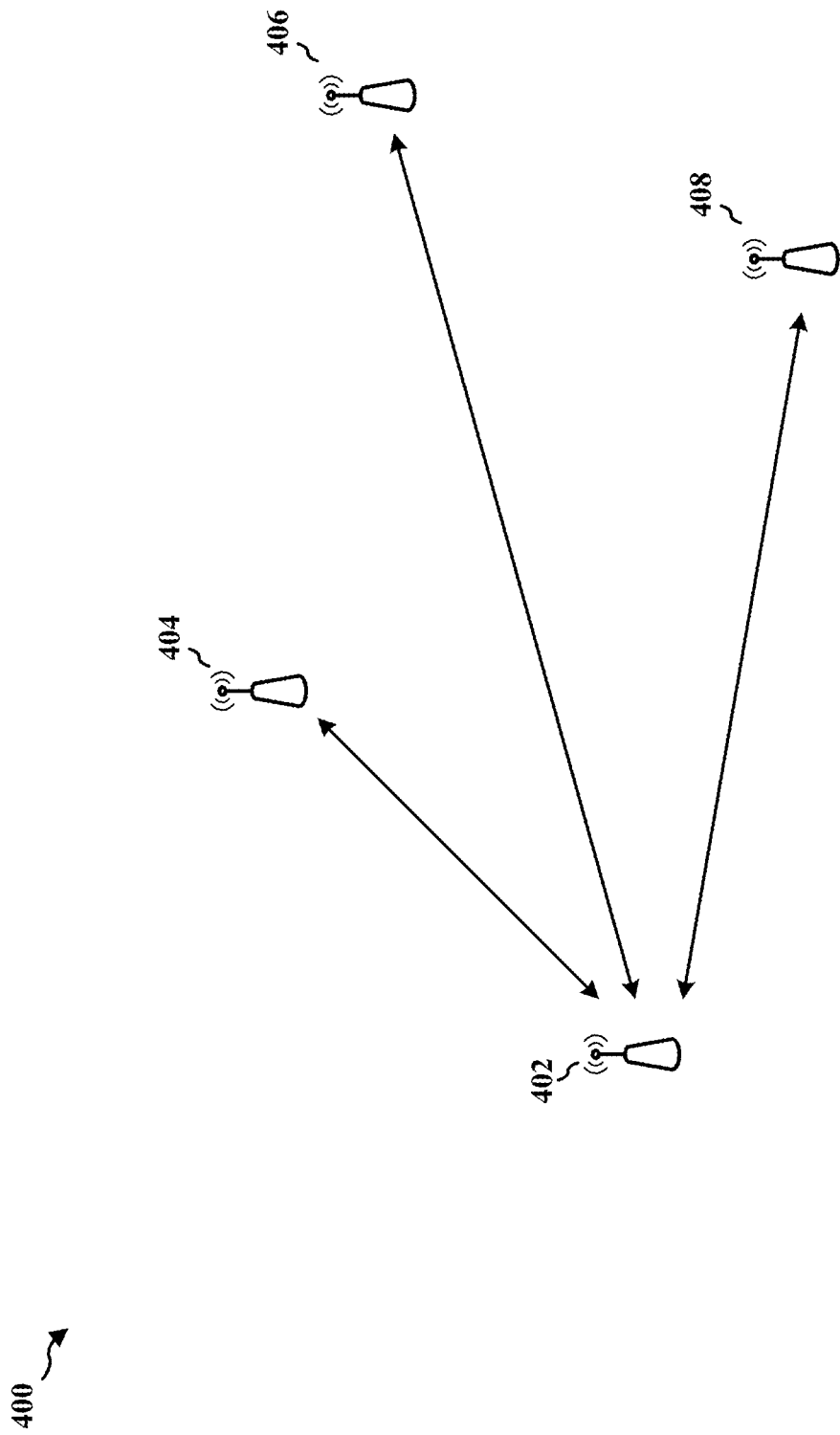
FIG. 4 illustrates an example wireless communication system including of a BS.

FIG. 4 illustrates an example wireless communication system 400 including a BS 402. The BS 402 may be a small cell BS, for example. As described in connection with FIG. 1, a small cell base stations may include femtocells, picocells, or microcells. The wireless communication system 400 includes the small cell BS 402 and a plurality of neighbor BSs including a first neighbor BS 404, a second neighbor BS 406, and a third neighbor BS 408. The plurality of neighbor BSs may be small cell BSs or large cell BSs (e.g., which may be referred to as a macrocell BS). Each of the BSs may correspond to a base station such as 180 or 102 in FIG. 1.

In some aspects, a PUCCH configuration common Information Element (IE) (e.g., which may be referred to as a "PUCCH-ConfigCommon IE" parameter) may be used to configure the cell specific PUCCH parameters for the small cell BS 402. The PUCCH-ConfigCommon-IE may include a common resource parameter for PUCCH (e.g., which may be referred to as a "PUCCH-ResourceCommon" parameter) indicating PUCCH resources during initial access on the initial uplink BWP. The PUCCH-ConfigCommon-IE may include a PUCCH group hopping parameter for the common PUCCH configuration (e.g., which may be referred to as a "PUCCH-GroupHopping" parameter) indicating a configuration of group and sequence hopping for various PUCCH formats. For example, the PUCCH group hopping parameter may indicate group of sequence hopping configuration information for each of PUCCH format 0, PUCCH format 1, PUCCH format 3 and PUCCH format 4. The PUCCH-ConfigCommon-IE may include a hopping identifier (ID) parameter (e.g., which may be referred to as a "hoppingId" parameter) indicating the Cell-Specific scrambling ID for group hopping and sequence hopping. The PUCCH-ConfigCommon-IE may include a power control parameter, such as a nominal power control parameter (e.g., which may be referred to as a "p0-nominal" parameter) indicating a power control parameter PO for the PUCCH transmissions.

The small cell BS 402 may operate in a dense network environment including multiple neighboring BSs, including the first neighbor BS 404, the second neighbor BS 406, and the third neighbor BS 408. The BS 402 may have coverage adjacent to or overlapping with one or more of the neighbor BSs 404, 406, or 408. As noted above, the BS 402 may be placed and operated separate from a network planned by a central network entity. Without a systematical plan for the BS 402, the BS 402 may have degraded performance due to multiple issues including interference on the PUCCH RBs, missed and/or incorrect detections of scheduling request (SR)/ACK/NACK, and/or increased false alarm from detecting ACK/NACK/SR instead of declaring DTXs. Similarly, the BS 402 may interfere with one or more of the neighbor cells.

In some aspects, the small cell BS 402 may be a plug-and-play device to fill in the coverage gaps between large cell BSs and/or macro cell BSs, and may not be configured by a network operator before operation. For example, the small cell BS 402 may be a self-organized networks (SON) capable device, and the small cell BS 402. Aspects presented herein enable the BS 402 to detect the neighbor configuration and use it to plan the configuration of the small cell BS 402. For example, the BS 402 may automatically detect the neighbor cell configurations and may apply one or more configuration parameters to avoid interference with the neighbor BSs. That is, the small cell BS 402 may detect the PUCCH common configuration parameters (e.g., PUCCH-ConfigCommon-IE parameters) of the plurality of neighbor BSs including the first neighbor BS 404, the second neighbor BS 406, and the third neighbor BS 408, and may configure the PUCCH-ConfigCommon-IE parameters of the small cell BS 402 based on the detected PUCCH-Config-Common-IE parameters of the plurality of neighbor BSs.

In some aspects, the PCI of the small cell BS 402 may also play a role in data scrambling and demodulation reference signal (DMRS) Sequence generating for various uplink (UL)/downlink (DL) channels, e.g., except for a physical random access channel (PRACH). The small cell BS 402 may use a PCI or a Cell ID bound by high valued modulus operation such that every PCI value of 1007 possible values can generate a unique sequence initialization value ($C_{init}$) for data scrambling and sequence generation, including PBCH data scrambling, PDSCH/PUSCH data scrambling, PDSCH/PUSCH DMRS sequence generation, PDCCH data scrambling, PDCCH DMRS sequence generation.

In some aspects, the PUCCH may also have sequence and group hopping where the PUCCH-hopping-Id can be the same as PCI and may be bound by a lower valued modulo operation. For example, the PUCCH sequence group hopping ID may include the modulo operation of $n_{ID}$ mod x, where x is an integer. Accordingly, although there are 1007 unique PCI values, x number of unique sequences of the PUCCH may be available for the base stations. In one aspect, the sequence and group hopping of the PUCCH may be bound by a modulo of 30. That is, the PUCCH sequence group hopping ID may include the modulo operation of $n_{ID}$ mod 30. Accordingly, although there are 1007 unique PCI values, 30 unique sequences of the PUCCH may be available for the base stations. 30 is merely one example, and the aspects presented herein may be applied for other values of x may that are lower than 1007. In some examples, the values of x may be less than 200, less than 100, less than 50, etc.

The small cell BS 402 may choose the PCI so that the chosen PCI may be different from the PCIs of the plurality of neighbor BSs and so that the PCI generates a unique hopping sequence that may be different from the plurality of neighbor BSs, including a first neighbor BS 404, a second neighbor BS 406, and a third neighbor BS 408.

In some aspects, a base station may perform a network listen (NL) scan and fetch to obtain the PUCCH-Config-Common-IE of the neighbor BSs. The small cell BS 402 may perform the NL scan of the neighboring cells of the plurality of neighbor BSs and receive one or more system information blocks (SIBs) from the plurality of neighbor BSs. The SIB1 of each neighbor BS may include the PUCCH-ConfigCommon-IE. The small cell BS 402 may decode the SIM of each neighbor BS, from which the small cell BS 402 may extract the PUCCH-ConfigCommon-IE for the corresponding neighbor cell. The PUCCH-ConfigCommon-IE may include various parameters. The parameters of the PUCCH-ConfigCommon-IE may include PUCCH-ResourceCommon parameter, including an integer value within a range [0, 15], representing a set of cell-specific PUCCH resources/parameters. The configuration of the PUCCH-ResourceCommon parameter may be optional. The parameters of the PUCCH-ConfigCommon-IE may include PUCCH-GroupHopping parameter, indicating neither, enable, or disable, representing the PUCCH group hopping mode and/or the PUCCH sequence hopping mode. The parameters of the PUCCH-ConfigCommon-IE may include hoppingId parameter, including an integer value within a range [0, 1023], representing the PUCCH hopping ID. The configuration of the hoppingId parameter may be optional. The parameters of the PUCCH-ConfigCommon-IE may include p0-nominal parameter, including an integer value within a range [−202, 24], representing the PUCCH transmission power in dBm. The configuration of the p0-nominal parameter may be optional.

The small cell BS 402 may use the parameters of the PUCCH-ConfigCommon-IE extracted from the SIB1 received from the plurality of neighbor BSs, including the first neighbor BS 404, the second neighbor BS 406, and the third neighbor BS 408 to decide, or otherwise configure, the PUCCH Common Configuration of the small cell BS 402.

In some aspects, the small cell BS 402 may select the PUCCH-GroupHopping parameter, the hoppingId parameter, and the PCI of the small cell BS 402 based on each PUCCH-ConfigCommon-IE received from the plurality of neighbor BSs, including the first neighbor BS 404, the second neighbor BS 406, and the third neighbor BS 408.

The PUCCH-GroupHopping parameter may be applicable for PUCCH format 0, PUCCH format 1, PUCCH format 3, and PUCCH format 4. For example, the PUCCH-GroupHopping parameter may indicate one of neither, enable, or disable. The hoppingId parameter may have an integer value in the range [0, 1023]. The PUCCH-GroupHopping and the hoppingId $n_{ID}$, together, may play a role in generating orthogonal PUCCH sequences for the small cell BS 402.

The PUCCH formats 0, 1, 3, and 4 may use sequences depending on a sequence group u and a sequence number v. The sequence group $u=(f_{gh}+f_{ss})$ mod 30 and the sequence number v may be configured based on the PUCCH-GroupHopping parameter and the hoppingId parameter.

In one aspect, the PUCCH-GroupHopping parameter may represent the value "neither," indicating that neither the group nor the sequence hopping is enabled. That is, the small cell BS 402 may determine that the PUCCH-GroupHopping parameter represents the value "neither," the small cell BS 402 may determine the sequence group $u=(f_{gh}+f_{ss})$ mod 30 and the sequence number v of the small cell BS 402 based on the following equations:

$$f_{gh}=0$$

$$f_{ss}=n_{ID} \bmod 30$$

$$v=0$$

Here, $n_{ID}$ may be a hopping ID configured by the higher-layer parameter hoppingId. The hoppingId parameter may be optional, and if the hopping ID is not configured, the $n_{ID}$ may be $N_{ID}^{cell}$, the cell ID or the PCI.

Referring to the wireless communication system 400, the first neighbor BS 404 may have a first hopping ID $n_{ID1}$, the second neighbor BS 406 may have a second hopping ID $n_{ID2}$, and the third neighbor BS 408 may have a third hopping ID $n_{ID3}$. The small cell BS 402 may extract the $n_{ID1}$, the $n_{ID2}$, and the $n_{ID3}$, and determine the hopping ID $n_{ID}$ of the small cell BS 402 based on the $n_{ID1}$, the $n_{ID2}$, and the $n_{ID3}$. The condition to choose the $n_{ID}$ from the defined range may be that the $n_{ID}$ mod 30 is not equal to any of $n_{ID1}$ mod 30, $n_{ID2}$ mod 30, and $n_{ID3}$ mod 30. That is, the small cell BS 402 may determine the $n_{ID}$ to meet the following conditions:

$$n_{ID} \bmod 30 \neq n_{ID1} \bmod 30,$$

$$n_{ID} \bmod 30 \neq n_{ID2} \bmod 30, \text{ and}$$

$$n_{ID} \bmod 30 \neq n_{ID3} \bmod 30$$

The hoppingId parameter may be an optional parameter. When the hoppingId parameter is not configured, the hopping ID may be equal to the Cell ID or the PCI. In such a case, the small cell BS 402 may choose the PCI to meet the following conditions:

$$PCI \bmod 30 \neq n_{ID1} \bmod 30,$$

$$PCI \bmod 30 \neq n_{ID2} \bmod 30, \text{ and}$$

$$PCI \bmod 30 \neq n_{ID3} \bmod 30$$

The small cell BS 402 may choose the hoppingId parameter and the PCI based on the PUCCH-GroupHopping parameter. That is, in case the PUCCH-GroupHopping parameter represents the value "enable" or "disable," the small cell BS may choose the $n_{ID}$) or the PCI such that the value returned by the related functions are not the same as those returned when applying the hopping ID of the plurality of neighbor BSs.

In another aspect, the PUCCH-GroupHopping parameter may represent the value "enable," indicating that the group hopping is enabled and the sequence hopping is disabled. That is, the small cell BS 402 may determine that the PUCCH-GroupHopping parameter represents the value "enable," the small cell BS 402 may determine the sequence group $u=(f_{gh}+f_{ss})$ mod 30 and the sequence number v of the small cell BS 402 based on the following equations:

$$f_{gh} = (\Sigma_{m=0}^{7} 2^{m} c(8(2n_{s,f}^{\mu} + n_{hop}) + m)) \bmod 30$$

$$f_{ss} = n_{ID} \bmod 30$$

$$v = 0$$

Here, the c(i) may be a pseudo-random sequence initialized with $C_{init} = \lfloor n_{ID}/30 \rfloor$ at the beginning of each radio frame and the $n_{ID}$ may be a hopping ID configured by the higher-layer parameter hoppingId. The hoppingId parameter may be optional, and if the hopping ID is not configured, the $n_{ID}$ may be $N_{ID}^{cell}$, the cell ID or the PCI.

Referring to the wireless communication system 400, the first neighbor BS 404 may have the $n_{ID1}$, the second neighbor BS 406 may have the ID $n_{ID2}$, and the third neighbor BS 408 may have the ID $n_{ID3}$. The small cell BS 402 may extract the $n_{ID1}$, the $n_{ID2}$, and the $n_{ID3}$, and determine the hopping ID $n_{ID}$ of the small cell BS 402 based on the $n_{ID1}$, the $n_{ID2}$, and the $n_{ID3}$. That is, the small cell BS 402 may determine the $n_{ID}$ from the defined range such that the two functions of the $f_{gh}$ and the $f_{ss}$ are not same as the corresponding functions based on the $n_{ID1}$, the $n_{ID2}$, and the $n_{ID3}$.

In another aspect, the PUCCH-GroupHopping parameter may represent the value "disable," indicating that the group hopping is disabled and the sequence hopping is enabled. That is, the small cell BS 402 may determine that the PUCCH-GroupHopping parameter represents the value "disable," the small cell BS 402 may determine the sequence group $u=(f_{gh}+f_{ss})$ mod 30 and the sequence number v of the small cell BS 402 based on the following equations:

$$f_{gh} = 0$$

$$f_{ss} = n_{ID} \bmod 30$$

$$v = c(2n_{s,f}^{\mu} + n_{hop})$$

Here, the c(i) may be the pseudo-random sequence initialized with $C_{init} = 2^{5} \lfloor n_{ID}/30 \rfloor + (n_{ID} \bmod 30)$ at the beginning of each radio frame and the $n_{ID}$ may be a hopping ID configured by the higher-layer parameter hoppingId. The hoppingId parameter may be optional, and if the hopping ID is not configured, the $n_{ID}$ may be $N_{ID}^{cell}$, the cell ID or the PCI.

Referring to the wireless communication system 400, the first neighbor BS 404 may have the $n_{ID1}$, the second neighbor BS 406 may have the ID $n_{ID2}$, and the third neighbor BS 408 may have the ID $n_{ID3}$. The small cell BS 402 may extract the $n_{ID1}$, the $n_{ID2}$, and the $n_{ID3}$, and determine the hopping ID $n_{ID}$ of the small cell BS 402 based on the $n_{ID1}$, the $n_{ID2}$, and the $n_{ID3}$. That is, the small cell BS 402 may determine the $n_{ID}$ from the defined range such that the two functions of the $f_{gh}$ and the $f_{ss}$ are not same as the corresponding functions based on the $n_{ID1}$, the $n_{ID2}$, and the $n_{ID3}$.

In some aspects, the small cell Bs 402 may choose the PUCCH-ResourceCommon parameter. The PUCCH-ResourceCommon parameter indicate the PUCCH resources during initial access on the initial uplink BWP. That is, the PUCCH-ResourceCommon parameter may represent a set of cell-specific PUCCH resources/parameters. In one aspect, the PUCCH-ResourceCommon parameter may indicate an integer value within a range [0, 15], and the integer value indicated by the PUCCH-ResourceCommon may represent an entry of a 16-row table. Each row of the 16-row table may be configured to include a set of cell-specific PUCCH resources/parameters. Accordingly, the UE may use the set of cell-specific PUCCH resources/parameters indicated by the PUCCH-ResourceCommon parameter during the initial access on the initial uplink BWP. Table A below may be an example of the 16-row table, each row including a set of cell-specific PUCCH resources/parameters.

TABLE A an example of PUCCH resource sets

| Index | PUCCH format | First symbol | Number of symbols | PRB offset $RB_{BWP}^{offset}$ | Set of initial CS indices |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |

TABLE A-continued an example of PUCCH resource sets

| Index | PUCCH format | First symbol | Number of symbols | PRB offset $RB_{BWP}^{offset}$ | Set of initial CS indices |
|---|---|---|---|---|---|
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

Referring to the wireless communication system 400, the first neighbor BS 404 may be using Index #0 from the above table, the second neighbor BS 406 may be using the Index #4, and the third neighbor BS 408 may be using the Index #9. The small cell BS 402 may choose a different index such that there is no overlap over time/frequency resources and/or the initial cyclic Shift indices. By doing so better reliability of PUCCH detection/decoding can be achieved, especially for UEs in initial access stage.

In some aspects, unique identities may not be available for the small cell BS 402. The small cell BS 402 may configure unique identities ($n_{ID}$/PCI) to generate orthogonal PUCCH sequences or choose the PUCCH-ResourceCommon parameter to transmit the PUCCH at a unique time/frequency resource, based on the PUCCH-ConfigCommon-IE parameters received from the plurality of neighbor BSs including the first neighbor BS 404, the second neighbor BS 406, and the third neighbor BS 408. Since some of these equations from which the PUCCH-ConfigCommon-IE parameters are based are bound by a factor of modulo of 30, there are thirty unique outputs available for the BSs to adopt. Accordingly, the small cell BS 402 may not find unique identities to configure. That is, in case the plurality of neighbor BSs have applied all 30 available identities, the small cell BS 402 may not configure the unique PUCCH sequence different from the plurality of neighbor BSs, or the small cell BS 402 may not select a unique time/frequency resource to transmit the PUCCH. In such a case, the small cell BS 402 may reduce the impact of interference on the PUCCH transmission.

FIG. 4 illustrates that the wireless communication system 400 includes three neighbor BS including the first neighbor BS 404, the second neighbor BS 406, and the third neighbor BS 408, but the aspects of the present disclosure are not necessarily limited thereto. The plurality of neighbor BS may include any number of neighbor BSs. In case the plurality of neighbor BS includes 30 neighbor BSs using 30 different unique PUCCH sequences. In such a case, the small cell BS 402 may determine that all the available unique PUCCH sequences are already taken by the neighbor BSs.

In some aspects, the small cell BS 402 may determine that there is no unique PCI available for the small cell BS 402 to configure, and the small cell BS 402 may reuse a PCI of a neighbor BS that is located the farthest from the small cell BS 402. The small cell BS 402 may determine the distance of each neighbor BS from the small cell BS 402 based on a corresponding channel metric. For example, the small cell BS 402 may perform the NL scan to measure one or more channel metrics from UEs or receive one or more measurement reports from UEs to determine which neighbor BS is disposed the farthest from the small cell BS 402. Here, the one or more channel metrics may include a received signal strength indicator (RSSI), a reference signal received power (RSRP), a reference signal received quality (RSRQ), a signal-to-noise ratio (SNR) or a signal-to-interference-plus-noise ratio (SINR), and the one or more measurement reports from UEs may include a channel status information (CSI) report including the one or more channel metrics.

The small cell BS 402 may configure the PCI by reusing the PCI of the neighbor BS that is located the farthest distance from the small cell BS, or that has a lowest measurement (e.g., RSRP, RSSI, RSRQ, or SINR), and the impact of mutual interference may be reduced because the PCI of small cell BS 402 is the same as one of the neighbor BS that is located at a greatest distance among a set of neighbor BS. The set of neighbor BS may be based on the neighbor BS for which the BS 402 receives a SIB, for example.

In some aspects, the small cell BS 402 may also control a power control parameter, such as a nominal power control parameter (e.g., the p0-nominal parameter) when determining to reuse the PCI of the neighbor BS located the farthest distance from the small cell BS 402. The p0-nominal parameter may be the power control parameter indicating the power of the PUCCH transmissions. The p0-nominal parameter may have even values with the step size of 2 within the range [−202, 24], representing the PUCCH transmission power in dBm. The small cell BS 402 may determine the p0-nominal parameter to reduce the PUCCH transmission power in comparison to the neighbor BS bearing the same PCI, so that the UL transmissions belonging to the Small Cell BS does not interfere, or interferes with a lesser magnitude, with its neighbor BS. That is, the small cell BS 402 may reduce the PUCCH transmission power based on the PUCCH transmission power for the neighbor BS having the same PCI, and the UL transmissions of the small cell BS 402 in order to reduce interference with the neighbor BS having the same PCI.

Referring to the wireless communication system 400, the small cell BS 402 may determine that no unique PCI is available for the small cell BS 402 to configure, and the small cell BS 402 may determine the one or more channel metrics of the first neighbor BS 404, the second neighbor BS 406, and the third neighbor BS 408. The small cell BS 402 may perform the NL scan to measure the one or more channel metrics of the first neighbor BS 404, the second neighbor BS 406, and the third neighbor BS 408. The small cell BS 402 may receive one or more measurement reports from UEs including the one or more channel metrics of the first neighbor BS 404, the second neighbor BS 406, and the third neighbor BS 408. The small cell BS 402 may determine the distance of the first neighbor BS 404, the second neighbor BS 406, and the third neighbor BS 408 from the small cell BS 402 based on the one or more channel metrics of the first neighbor BS 404, the second neighbor BS 406, and the third neighbor BS 408. In one aspect, the small cell BS 402 may determine that the second neighbor BS 406 is disposed the farthest from the small cell BS 402. Upon determining that the second neighbor BS 406 is positioned the farthest from the small cell BS 402, the small cell BS 402 may configure the PCI of the small cell BS 402 as same as the second neighbor BS 406. Upon determining to configure the PCI of the small cell BS 402 as same as the second neighbor BS 406, the small cell BS 402 may also determine the p0-nominal parameter of the small cell BS 402 at a reduced level and reduce the PUCCH transmission power for the small cell BS 402 based on the PUCCH transmission power for the second neighbor BS 406. The UL transmissions of the small cell BS 402 may have no or reduced interference with the PUCCH transmission of the second neighbor BS 406 having the same PCI.

In some aspects, the small cell BS may closely track the PUCCH cell configurations of neighbor cells, and the small cell BS may better plan its PUCCH configurations to avoid or reduce the interference and increase or improve the reliability of decoding the PUCCH transmissions to the small cell BS. The small cell BS may be a SON device that may use the NL scan to acquire neighbor information, and the small cell BS may configure the PUCCH without requesting a change to the network. The small cell BS and the neighbor BS may avoid or reduce operating on the similar/overlapping PUCCH configurations, thereby avoiding or reducing interference and/or correlation at the receivers, performance degradation including CRC Error, incorrect ACK/NACK detections, etc., and increased false alarms of the PUCCH transmissions.

Figure 5:
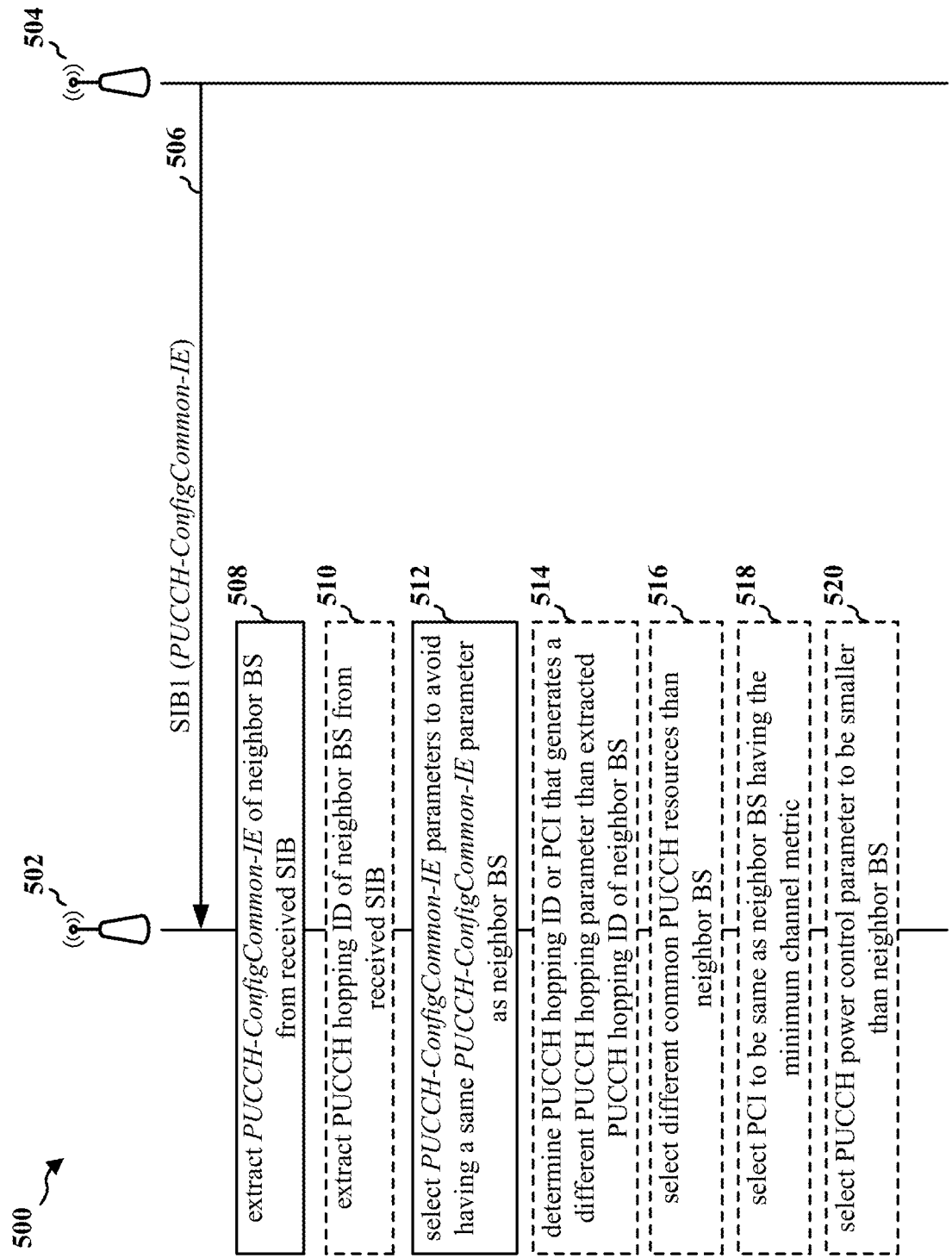
FIG. 5 is a communication diagram of wireless communication.

FIG. 5 is a communication diagram 500 of wireless communication. The call-flow diagram 500 may include a BS 502 and a neighbor BS 504. The BS 502 may be a small cell BS. FIG. 5 illustrates one neighbor BS 504, but the aspects of the present disclosure are not limited thereto, and the wireless communication may include a plurality of neighbor BSs.

At 506, the small cell BS 502 may receive at least one SIB from one or more neighbor BSs including the neighbor BS 504.

At 508, the small cell BS 502 may extract a PUCCH common configuration from the SIB for each of the one or more neighbor BSs including the neighbor BS 504. The SIB1 of each neighbor BS may include the PUCCH-ConfigCommon-IE including the PUCCH-ResourceCommon parameter, PUCCH-GroupHopping parameter, hoppingId parameter, or p0-nominal parameter.

At 510, the small cell BS 502 may extract at least one PUCCH hopping ID of the one or more neighbor BSs including the neighbor BS 504 from the received at least one SIB. The PUCCH hopping may include at least one of PUCCH group hopping or PUCCH sequence hopping, and the PUCCH-GroupHopping parameter may indicate the PUCCH group hopping mode and/or the PUCCH sequence hopping mode.

At 512, the small cell BS 502 may select one or more PUCCH common configuration parameters for the small cell BS 502 to avoid having the same PUCCH common configuration as the one or more neighbor BSs including the neighbor BS 504, the same PUCCH common configuration including at least one of a PUCCH hopping parameter or a common PUCCH resource. The small cell BS 502 may select the ID associated with the PUCCH hopping of the small cell BS 502 to be different than the extracted at least one PUCCH hopping ID after application of a modulus operation for the PUCCH hopping. The ID associated with the PUCCH hopping may include a hopping ID, and the small cell BS 502 may determine the identifier associated with the PUCCH hopping of the small cell BS 502 ($n_{ID1}$) such that $n_{ID1}$ modulo 30 is not equal to $n_{ID2}$ modulo 30, where the $n_{ID2}$ is the PUCCH hopping ID of each of the one or more neighbor BSs including the neighbor BS 504. Also, the ID associated with the PUCCH hopping may include a PCI, and the small cell BS may determine the PCI of the small cell BS 502 such that PCI modulo 30 is not equal to $n_{ID2}$ modulo 30, where the $n_{ID2}$ is the PUCCH hopping ID of each of the one or more neighbor BSs including the neighbor BS 504.

At 514, the small cell BS 502 may determine an ID associated with PUCCH hopping of the small cell BS 502 that generates a different PUCCH hopping parameter than the extracted at least one PUCCH hopping ID of the one or more neighbor BSs including the neighbor BS 504. That is, the small cell BS 502 may have the sequence group $u=(f_{gh}+f_{ss})$ mod 30 and the sequence number v, and the small cell BS 502 may determine the PUCCH hopping ID or the PCI such that the value returned by the related functions $f_{gh}$ and $f_{ss}$ are not the same as those returned when applying the hopping ID of the one or more neighbor BSs including the neighbor BS 504.

At 516, the small cell BS 502 may select a different common PUCCH resource than the one or more neighbor BSs. The PUCCH-ResourceCommon parameter may indicate the common PUCCH resource parameter, and the different common PUCCH resource parameter may indicate at least one of a time resource, a frequency resource, or an initial cyclic shift index different from the corresponding common PUCCH resource parameter of the one or more neighbor BSs.

At 518, the small cell BS 502 may select the PCI for the small cell BS 502 to be same as a first neighbor BS among the one or more neighbor BSs having the minimum channel metric. The small cell BS 502 may determine that there is no unique PCI available for the small cell BS 502 to configure, and the small cell BS 502 may reuse a PCI of a neighbor BS that is located the farthest from the small cell BS. The distance of each neighbor BS from the small cell BS 502 may be determined based on the corresponding channel metrics.

At 520, the small cell BS 502 may select a PUCCH power control parameter for the small cell BS 502 to be smaller than the first neighbor BS. The p0-nominal parameter may be the power control parameter indicating the power of the PUCCH transmissions. The small cell BS 502 may control the PUCCH transmission power based on the PUCCH transmission power for the first neighbor BS having the same PCI, so that the UL transmissions of the PUCCH for the small cell BS 502 may have no or reduced interference with the first neighbor BS with the same PCI.

Figure 6:
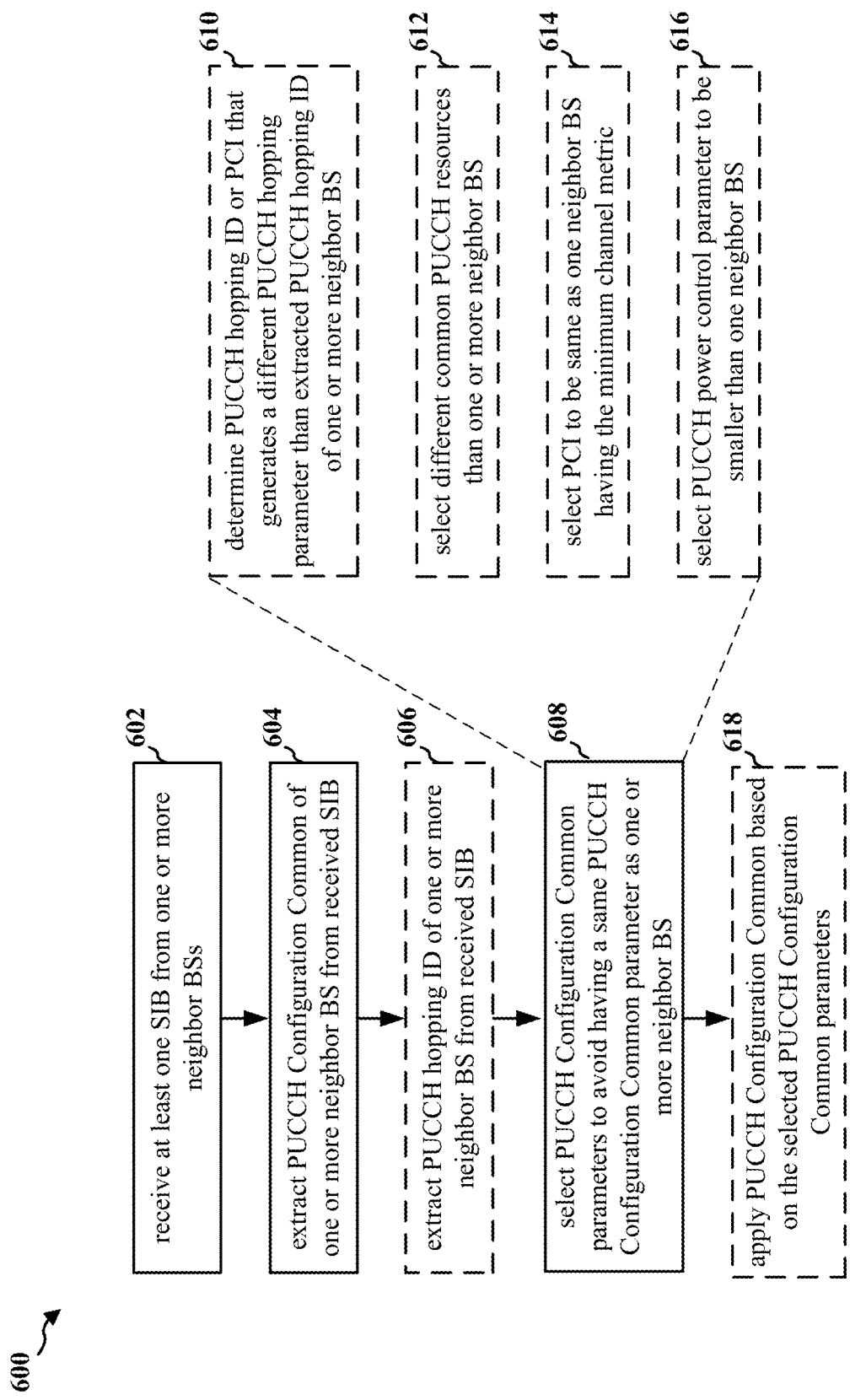
FIG. 6 is a flowchart of a method of wireless communication.

FIG. 6 is a flowchart 600 of a method of wireless communication. The method may be performed by a BS (e.g., the BS 102/180, the small cell BS 402/502; the apparatus 702). The method may be performed by a small cell base station, for example. Optional aspects are illustrated with a dashed line. The method may help a base station to select a configuration that helps to avoid interference with neighbor cells.

At 602, the BS may receive at least one SIB from one or more neighbor BSs. Example aspects of SIB reception from a neighbor base station are described in connection with 506 in FIG. 5. For example, 602 may be performed by an NL scan component 742 of the apparatus 702 in FIG. 7.

At 604, the BS may extract a PUCCH common configuration from the SIB for each of the one or more neighbor BSs (e.g., which may include aspects described in connection with 508 in FIG. 5). The SIB1 of each neighbor BS may include the PUCCH-ConfigCommon-IE including the PUCCH-ResourceCommon parameter, PUCCH-GroupHopping parameter, hoppingId parameter, or p0-nominal parameter, for example. For example, 604 may be performed by a PUCCH/PCI configuration component 740 of the apparatus 702 in FIG. 7.

At 606, the BS may extract at least one PUCCH hopping ID of the one or more neighbor BSs from the received at least one SIB. For example, the extraction may include aspects described in connection with the extraction at 510 in FIG. 5. The PUCCH hopping may include at least one of PUCCH group hopping or PUCCH sequence hopping, and the PUCCH-GroupHopping parameter may indicate the PUCCH group hopping mode and/or the PUCCH sequence hopping mode. For example, 606 may be performed by the PUCCH/PCI configuration component 740 of the apparatus 702 in FIG. 7.

At 608, the BS may select one or more PUCCH common configuration parameters for the small cell BS to avoid having the same PUCCH common configuration as the one or more neighbor BSs, the same PUCCH common configuration including at least one of a PUCCH hopping parameter or a common PUCCH resource. The selection may include aspects described in connection with 512 in FIG. 5). As illustrated in FIG. 6, 608 may include a combination of aspects from 610, 612, 614, or 616. The BS may select the ID associated with the PUCCH hopping of the BS to be different than the extracted at least one PUCCH hopping ID after application of a modulus operation for the PUCCH hopping. The ID associated with the PUCCH hopping may include a hopping ID, and the BS may determine the identifier associated with the PUCCH hopping of the BS 502 ($n_{ID1}$) such that $n_{ID1}$ modulo 30 is not equal to $n_{ID2}$ modulo 30, where the $n_{ID2}$ is the PUCCH hopping ID of each of the one or more neighbor BSs. Modulo 30 is merely one example, and the UE may base station may select an ID associated with PUCCH hopping such that the PUCCH hopping of the base station is not equal to a neighbor cell's ID modulo X, where X may be 30 or may be a different defined integer. Also, the ID associated with the PUCCH hopping may include a PCI, and the BS may determine the PCI of the BS 502 such that PCI modulo 30 (or modulo X) is not equal to $n_{ID2}$ modulo 30, where the $n_{ID2}$ is the PUCCH hopping ID of each of the one or more neighbor BSs. For example, 608 may be performed by the PUCCH/PCI configuration component 740 of the apparatus 702 in FIG. 7.

At 610, as apart of 606, the BS may determine an ID associated with PUCCH hopping of the small cell BS that generates a different PUCCH hopping parameter than the extracted at least one PUCCH hopping ID of the one or more neighbor BSs (e.g., and may include aspects described at 514). That is, the BS may have the sequence group $u = (f_{gh} + f_{ss})$ mod 30 and the sequence number v, and the BS may determine the PUCCH hopping ID or the PCI such that the value returned by the related functions $f_{gh}$ and $f_{ss}$ are not the same as those returned when applying the hopping ID of the one or more neighbor BSs. For example, 610 may be performed by the PUCCH/PCI configuration component 740 of the apparatus 702 in FIG. 7.

At 612, as a part of 606, the BS may select a different common PUCCH resource than the one or more neighbor base stations (e.g., and may include aspects described at 516). The PUCCH-ResourceCommon parameter may indicate the common PUCCH resource parameter, and the different common PUCCH resource parameter may indicate at least one of a time resource, a frequency resource, or an initial cyclic shift index different from the corresponding common PUCCH resource parameter of the one or more neighbor base stations. For example, 612 may be performed by the PUCCH/PCI configuration component 740 of the apparatus 702 in FIG. 7.

At 614, as a part of 606, the BS may select the PCI for the base station to be the same as a first neighbor base station among the one or more neighbor base stations having the minimum channel metric (e.g., and may include aspects described at 518). The BS may determine that there is no unique PCI available for the BS to configure, and the BS may reuse a PCI of a neighbor BS that is located the farthest from the small cell BS. The distance of each neighbor BS from the BS may be determined based on the corresponding channel metrics. For example, 614 may be performed by the PUCCH/PCI configuration component 740 of the apparatus 702 in FIG. 7.

At 616, as a part of 606, the BS may select a PUCCH power control parameter for the small cell BS to be smaller than the first neighbor base station (e.g., and may include aspects described at 520). The p0-nominal parameter may be the power control parameter indicating the power of the PUCCH transmissions. The BS may control the PUCCH transmission power based on the PUCCH transmission power for the first neighbor BS having the same PCI, so that the UL transmissions of the PUCCH for the BS may have no or reduced interference with the first neighbor BS with the same PCI. For example, 616 may be performed by the PUCCH/PCI configuration component 740 of the apparatus 702 in FIG. 7.

As illustrated at 618, the BS may apply the configuration based on the selected PUCCH Configuration Common parameters, e.g., that are selected at 608. For example, the BS may transmit PUCCH based on the configuration.

Figure 7:
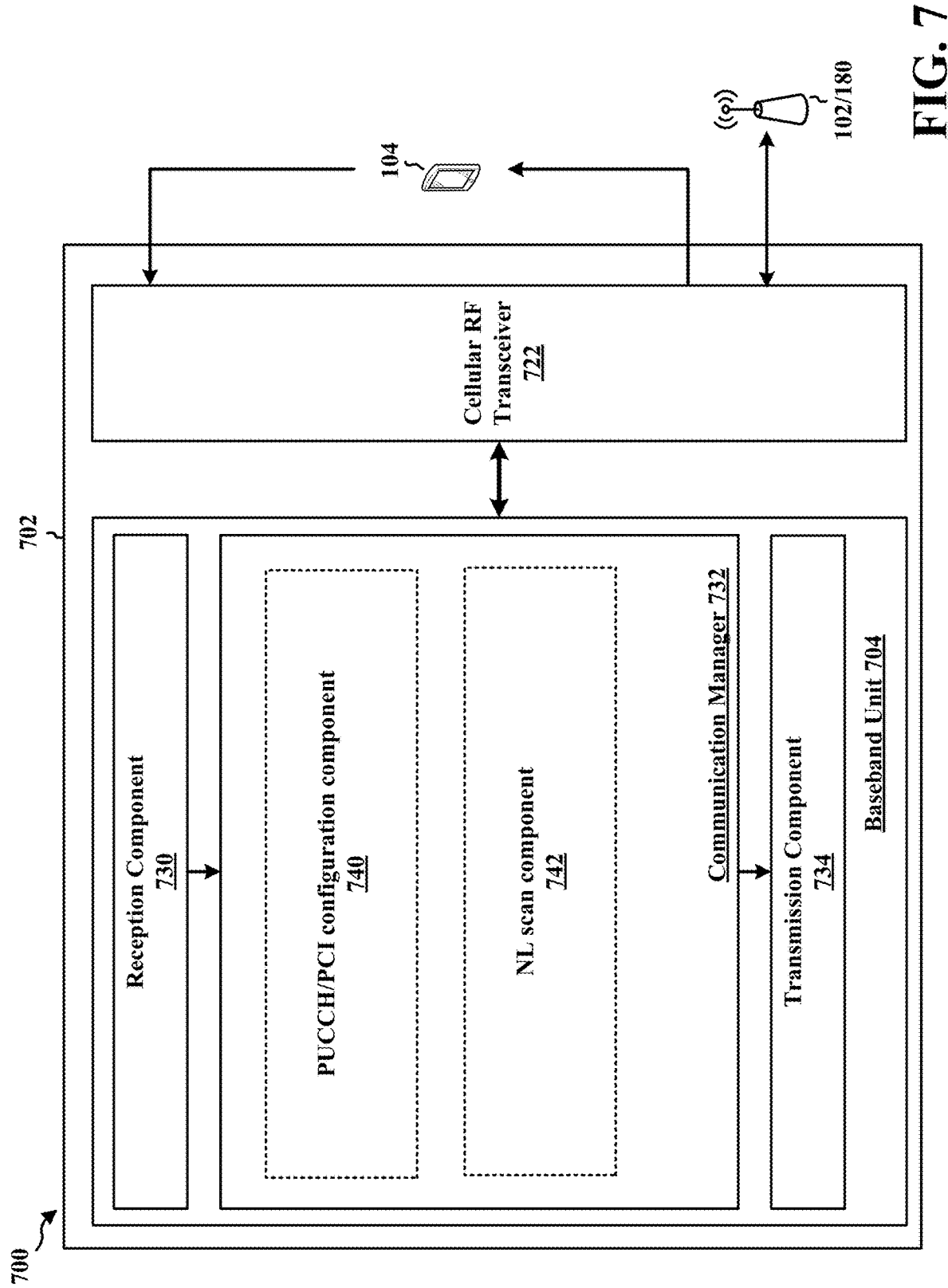
FIG. 7 is a diagram illustrating an example of a hardware implementation for an example apparatus.

FIG. 7 is a diagram 700 illustrating an example of a hardware implementation for an apparatus 702. The apparatus 702 is a BS and includes a baseband unit 704. The baseband unit 704 may communicate through a cellular RF transceiver 722 with the UE 104. The baseband unit 704 may include a computer-readable medium/memory. The baseband unit 704 is responsible for general processing, including the execution of software stored on the computer-readable medium/memory. The software, when executed by the baseband unit 704, causes the baseband unit 704 to perform the various functions described supra. The computer-readable medium/memory may also be used for storing data that is manipulated by the baseband unit 704 when executing software. The baseband unit 704 further includes a reception component 730, a communication manager 732, and a transmission component 734. The communication manager 732 includes the one or more illustrated components. The components within the communication manager 732 may be stored in the computer-readable medium/memory and/or configured as hardware within the baseband unit 704. The baseband unit 704 may be a component of the base station 310 and may include the memory 376 and/or at least one of the TX processor 316, the RX processor 370, and the controller/processor 375.

The communication manager 732 includes a PUCCH/PCI configuration component 740 that extract a PUCCH common configuration from the SIB for each of the one or more neighbor BSs, extract at least one PUCCH hopping ID of the one or more neighbor BSs from the received at least one SIB, select one or more PUCCH common configuration parameters for the small cell BS to avoid having the same PUCCH common configuration as the one or more neighbor BS, determine an ID associated with PUCCH hopping of the small cell BS that generates a different PUCCH hopping parameter than the extracted at least one PUCCH hopping ID of the one or more neighbor BSs, select a different common PUCCH resource than the one or more neighbor base stations, select the PCI for the base station to be the same as a first neighbor base station among the one or more neighbor base stations having the minimum channel metric, and select a PUCCH power control parameter for the small cell BS to be smaller than the first neighbor base station, e.g., as described in connection with 604, 606, 608, 610, 612, 614, and 616. The communication manager 732 further includes an NL scan component 742 that is configured to receive at least one SIB from one or more neighbor BSs, e.g., as described in connection with 602.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the baseband unit 704, includes means for receiving at least one SIB from one or more neighbor base stations, means for extracting a PUCCH common configuration from the SIB for each of the one or more neighbor base stations, and means for selecting one or more PUCCH common configuration parameters for the base station to avoid having a same PUCCH common configuration as the one or more neighbor base stations, the same PUCCH common configuration including at least one of a PUCCH hopping parameter or a common PUCCH resource. The apparatus 702 may include means for determining an ID associated with PUCCH hopping of the base station that generates a different PUCCH hopping parameter than the extracted at least one PUCCH hopping ID of the one or more neighbor base stations. The means for determining may determine a PCI of the base station such that PCI modulo 30 is not equal to $n_{ID}$ modulo 30, where the $n_{ID2}$ is the PUCCH hopping ID of each of the one or more neighbor base stations. The apparatus 702 may include means for selecting a different common PUCCH resource than the one or more neighbor base stations. The apparatus 702 may include means for selecting a PCI for the base station to be same as a first neighbor base station among the one or more neighbor base stations having the minimum channel metric, and means for selecting a PUCCH power control parameter for the base station to be smaller than the first neighbor base station. The aforementioned means may be one or more of the aforementioned components of the apparatus 702 configured to perform the functions recited by the aforementioned means. As described supra, the apparatus 702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a base station, receiving at least one SIB from one or more neighbor base stations, extracting a PUCCH common configuration from the SIB for each of the one or more neighbor base stations, and selecting one or more PUCCH common configuration parameters for the base station to avoid having a same PUCCH common configuration as the one or more neighbor base stations, the same PUCCH common configuration including at least one of a PUCCH hopping parameter or a common PUCCH resource.

Aspect 2 is the method of aspect 1, where the base station extracts at least one PUCCH hopping ID of the one or more neighbor base stations from the received at least one SIB, and selecting the one or more PUCCH common configuration parameters includes determining an ID associated with PUCCH hopping of the base station that generates a different PUCCH hopping parameter than the extracted at least one PUCCH hopping ID of the one or more neighbor base stations.

Aspect 3 is the method of aspect 2, where the base station selects the ID associated with the PUCCH hopping of the base station to be different than the extracted at least one PUCCH hopping ID after application of a modulus operation for the PUCCH hopping.

Aspect 4 is the method of any of aspects 2 and 3, where the PUCCH hopping include s at least one of PUCCH group hopping or PUCCH sequence hopping.

Aspect 5 is the method of any of aspects 2 to 4, where the base station determines the identifier associated with the PUCCH hopping of the base station ($n_{ID1}$) such that $n_{ID1}$ modulo 30 is not equal to $n_{ID2}$ modulo 30, where the $n_{ID2}$ is the PUCCH hopping ID of each of the one or more neighbor base stations.

Aspect 6 is the method of any of aspects 2 to 5, further including determining a PCI of the base station such that PCI modulo 30 is not equal to $n_{ID2}$ modulo 30, where the $n_{ID2}$ is the PUCCH hopping ID of each of the one or more neighbor base stations.

Aspect 7 is the method of any of aspects 2 to 6, where the ID associated with the PUCCH hopping includes a hopping ID.

Aspect 8 is the method of any of aspects 2 to 7, where the ID associated with the PUCCH hopping includes a cell ID.

Aspect 9 is the method of any of aspects 1 to 8, where selecting the one or more PUCCH common configuration parameters includes selecting a different common PUCCH resource than the one or more neighbor base stations.

Aspect 10 is the method of aspect 9, where the different common PUCCH resource parameter indicates at least one of a time resource, a frequency resource, or an initial cyclic shift index different from the corresponding common PUCCH resource parameter of the one or more neighbor base stations include.

Aspect 11 is the method of aspect 1, further including selecting the PCI for the base station to be the same as a first neighbor base station among the one or more neighbor base stations having the minimum channel metric.

Aspect 12 is the method of aspect 11, further including selecting a PUCCH power control parameter for the base station to be smaller than the first neighbor base station.

Aspect 13 is a device including one or more processors and one or more memories in electronic communication with the one or more processors storing instructions executable by the one or more processors to cause the device to implement a method as in any of aspects 1 to 12.

Aspect 14 is a system or apparatus including means for implementing a method or realizing an apparatus as in any of aspects 1 to 12.

Aspect 15 is a non-transitory computer-readable medium storing computer-executable code, where the code when executed by a processor causes the processor to implement a method as in any of aspects 1 to 12.

What is claimed is:

1. A method of wireless communication of a base station, comprising:
   receiving at least one system information block (SIB) from one or more neighbor base stations;
   extracting a physical uplink control channel (PUCCH) common configuration from the SIB for each of the one or more neighbor base stations; and
   selecting a different PUCCH hopping sequence than the one or more neighbor base stations, the different PUCCH hopping sequence generated based on a modulo bound by a factor of 30 and selection of the different PUCCH hopping sequence including:
      selecting an identifier ($n_{ID1}$) of the base station to be different than a neighbor identifier for each of the one or more neighbor base stations; and
      further selecting the identifier ($n_{ID1}$) of the base station such that $n_{ID1}$ modulo 30 is different than $n_{ID2}$ modulo 30, where the $n_{ID2}$ is a neighbor cell PUCCH hopping identifier (ID) of each respective neighbor base station of the one or more neighbor base stations.

2. The method of claim 1, wherein the base station extracts at least one neighbor PUCCH hopping ID of the one or more neighbor base stations from the received at least one SIB, and
   wherein the selecting the different PUCCH hopping sequence includes: determining the identifier that will generate the different PUCCH hopping sequence than the neighbor cell PUCCH hopping ID of the one or more neighbor base stations.

3. The method of claim 2, wherein PUCCH hopping at the base station includes at least one of PUCCH group hopping or PUCCH sequence hopping.

4. The method of claim 2, wherein the identifier corresponds to a physical cell identifier (PCI) of the base station, and selecting the different PUCCH hopping sequence than the one or more neighbor base stations includes selecting the PCI of the base station such that a PCI modulo 30 for the base station is different than a neighbor PCI modulo 30, where a neighbor PCI is the neighbor cell PUCCH hopping ID of each respective neighbor base station of the one or more neighbor base stations.

5. The method of claim 2, wherein the identifier comprises a hopping ID different than a PCI that is selected to provide the different PUCCH hopping sequence than the one or more neighbor base stations when generated based on a hopping ID modulo 30.

6. The method of claim 1, further comprising: selecting a different common PUCCH resource index than the one or more neighbor base stations, the different common PUCCH resource index corresponding to an entry in a table that provides at least one of a time resource, a frequency resource, or an initial cyclic shift index for initial access that is different than the one or more neighbor base stations.

7. The method of claim 6, wherein the different common PUCCH resource index indicates at least one of the time resource, the frequency resource, or the initial cyclic shift index that is different from a corresponding common PUCCH resource parameter of the one or more neighbor base stations.

8. The method of claim 6, wherein the different common PUCCH resource index includes an integer value that references a row of a defined table that includes entries for a first symbol, a number of symbols, a physical resource block offset, and the initial cyclic shift index for the initial access with the base station.

9. The method of claim 8, wherein selecting the different common PUCCH resource index includes selecting a different index from the defined table than the one or more neighbor base stations.

10. The method of claim 1, further comprising:
    selecting a physical cell identifier (PCI) for the base station to be same as an additional neighbor base station having a minimum channel metric that is lower than the one or more neighbor base stations.

11. The method of claim 10, further comprising: selecting a PUCCH power control parameter for the base station to be smaller than the additional neighbor base station.

12. The method of claim 1, wherein the identifier corresponds to a physical cell identifier (PCI) of the base station, and selecting the different PUCCH hopping sequence than the one or more neighbor base stations includes:
    selecting the PCI of the base station to be different than a neighbor PCI, and
    further selecting a PCI modulo 30 for the base station that is different than a neighbor PCI modulo 30 for each respective neighbor base station of the one or more neighbor base stations, where the neighbor PCI is the neighbor cell PUCCH hopping ID of a respective neighbor base station.

13. The method of claim 1, further comprising:
transmitting the identifier as a PUCCH hopping identifier in a PUCCH common configuration information element.

14. An apparatus for wireless communication of a base station, comprising:
a memory; and
at least one processor coupled to the memory and configured to:
receive at least one system information block (SIB) from one or more neighbor base stations;
extract a physical uplink control channel (PUCCH) common configuration from the SIB for each of the one or more neighbor base stations; and
select a different PUCCH hopping sequence than the one or more neighbor base stations, the different PUCCH hopping sequence generated based on a modulo bound by a factor of 30 and to select the different PUCCH hopping sequence, the at least one processor is configured to:
select an identifier ($n_{ID1}$) of the base station to be different than a neighbor identifier for each of the one or more neighbor base stations; and
further select the identifier ($n_{ID1}$) of the base station such that $n_{ID1}$ modulo 30 is different than $n_{ID2}$ modulo 30, where the $n_{ID2}$ is a neighbor cell PUCCH hopping identifier (ID) of each respective neighbor base station of the one or more neighbor base stations.

15. The apparatus of claim 14, wherein the at least one processor is configured to extract at least one neighbor PUCCH hopping ID of the one or more neighbor base stations from the at least one SIB, and
wherein the at least one processor is configured to select the different PUCCH hopping sequence for the base station to avoid having a same PUCCH hopping sequence as the one or more neighbor base stations by a determination of the identifier that will generate the different PUCCH hopping sequence than the at least one neighbor PUCCH hopping ID of the one or more neighbor base stations.

16. The apparatus of claim 15, wherein PUCCH hopping at the base station includes at least one of PUCCH group hopping or PUCCH sequence hopping.

17. The apparatus of claim 15, wherein the identifier corresponds to a physical cell identifier (PCI) of the base station, and the at least one processor is configured to select the different PUCCH hopping sequence than the one or more neighbor base stations based on a PCI selection of the PCI of the base station such that PCI modulo 30 for the base station is different than a neighbor PCI modulo 30, where a neighbor PCI is the neighbor cell PUCCH hopping ID of each respective neighbor base station of the one or more neighbor base stations.

18. The apparatus of claim 15, wherein the identifier comprises a hopping ID different than a PCI that is selected to provide the different PUCCH hopping sequence than the one or more neighbor base stations when generated based on a hopping ID modulo 30.

19. The apparatus of claim 14, wherein the at least one processor is further configured to:
select a different common PUCCH resource index than the one or more neighbor base stations, the different common PUCCH resource index corresponding to an entry in a table that provides at least one of a time resource, a frequency resource, or an initial cyclic shift index for initial access that is different than the one or more neighbor base stations.

20. The apparatus of claim 19, wherein the different common PUCCH resource index indicates at least one of the time resource, the frequency resource, or the initial cyclic shift index that is different from a corresponding common PUCCH resource index of the one or more neighbor base stations.

21. The apparatus of claim 19, wherein the different common PUCCH resource index includes an integer value that references a row of a defined table that includes entries for a first symbol, a number of symbols, a physical resource block offset, and the initial cyclic shift index for the initial access with the base station.

22. The apparatus of claim 21, wherein to select the different common PUCCH resource index, the at least one processor is configured to select a different index from the defined table than the one or more neighbor base stations.

23. The apparatus of claim 14, wherein the at least one processor is further configured to select a physical cell identifier (PCI) for the base station to be same as an additional neighbor base station having a minimum channel metric that is lower than the one or more neighbor base stations.

24. The apparatus of claim 23, wherein the at least one processor is further configured to select a PUCCH power control parameter for the base station to be smaller than the additional neighbor base station.

25. The apparatus of claim 14, wherein the identifier corresponds to a physical cell identifier (PCI) of the base station, and to select the different PUCCH hopping sequence than the one or more neighbor base stations, the at least one processor is configured to:
select the PCI of the base station to be different than a neighbor PCI, and
further select a PCI modulo 30 for the base station that is different than a neighbor PCI modulo 30 for each respective neighbor base station of the one or more neighbor base stations, where the neighbor PCI is the neighbor cell PUCCH hopping ID of a respective neighbor base station.

26. The apparatus of claim 14, wherein the at least one processor is further configured to:
transmit the identifier as a PUCCH hopping identifier in a PUCCH common configuration information element.

27. An apparatus for wireless communication at a base station, comprising:
means for receiving at least one system information block (SIB) from one or more neighbor base stations;
means for extracting a physical uplink control channel (PUCCH) common configuration from the SIB for each of the one or more neighbor base stations; and
means for selecting a different PUCCH hopping sequence than the one or more neighbor base stations, the different PUCCH hopping sequence generated based on a modulo bound by a factor of 30 and a selection of the different PUCCH hopping sequence including:
the selection of an identifier ($n_{ID1}$) of the base station to be different than a neighbor identifier for each of the one or more neighbor base stations; and
further selection of the identifier ($n_{ID1}$) of the base station such that $n_{ID1}$ modulo 30 is different than $n_{ID2}$ modulo 30, where the $n_{ID2}$ is a neighbor cell PUCCH hopping identifier (ID) of each respective neighbor base station of the one or more neighbor base stations.

28. A non-transitory computer-readable medium storing computer executable code for wireless communication at a base station, the code when executed by a processor causes the processor to:
   receive at least one system information block (SIB) from one or more neighbor base stations;
   extract a physical uplink control channel (PUCCH) common configuration from the SIB for each of the one or more neighbor base stations; and
   select a different PUCCH hopping sequence than the one or more neighbor base stations, the different PUCCH hopping sequence generated based on a modulo bound by a factor of 30 and a selection of the different PUCCH hopping sequence including:
   the selection of an identifier ($n_{ID1}$) of the base station to be different than a neighbor identifier for each of the one or more neighbor base stations; and
   further selection of the identifier ($n_{ID1}$) of the base station such that $n_{ID1}$ modulo 30 is different than $n_{ID2}$ modulo 30, where the $n_{ID2}$ is a neighbor cell PUCCH hopping identifier (ID) of each respective neighbor base station of the one or more neighbor base stations.

* * * * *